United States Patent
Brown et al.

(10) Patent No.: US 10,540,520 B2
(45) Date of Patent: *Jan. 21, 2020

(54) SELECTIVELY WIPING A REMOTE DEVICE

(71) Applicant: Blackberry Limited, Waterloo (CA)

(72) Inventors: Michael Kenneth Brown, Fergus (CA); Michael Stephen Brown, Kitchener (CA); Herbert Anthony Little, Waterloo (CA); Scott William Totzke, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/187,065

(22) Filed: Nov. 12, 2018

(65) Prior Publication Data

US 2019/0080114 A1    Mar. 14, 2019

Related U.S. Application Data (63) Continuation of application No. 15/475,901, filed on Mar. 31, 2017, now Pat. No. 10,162,983, which is a (Continued)

(51) Int. Cl.
*H04L 29/06* (2006.01)
*G06F 21/62* (2013.01)
(Continued)

(52) U.S. Cl.
CPC ........ *G06F 21/6245* (2013.01); *G06F 21/602* (2013.01); *G06F 21/6218* (2013.01);
(Continued)

(58) Field of Classification Search
CPC combination set(s) only.
See application file for complete search history.

(56) References Cited

U.S. PATENT DOCUMENTS

| 4,882,752 A | 11/1989 | Lindman et al. |
|---|---|---|
| 5,048,085 A | 9/1991 | Abraham et al. |

(Continued)

FOREIGN PATENT DOCUMENTS

| CA | 2388117 | 12/2002 |
|---|---|---|
| CA | 2495083 | 1/2008 |

(Continued)

OTHER PUBLICATIONS

International Search Report relating to application No. WO2006/044746 A3, dated Jun. 14, 2006.

(Continued)

*Primary Examiner* — Shin-Hon (Eric) Chen
(74) *Attorney, Agent, or Firm* — Rowand LLP (57) ABSTRACT

A system and method for selectively securing data from unauthorized access on a client device storing a plurality of data types with reference to an authorization level indicated in a command. A command is received at a client device comprising an authorization level indicator. Based on at least one predefined rule, which may be implemented in an IT policy stored at the client device, each of the plurality of data types to be secured is determined, and then the data corresponding to those types is secured. The data may be secured by encrypting and/or deleting the data at the client device. The predefined rules associated with each authorization level may be configured by a user or administrator having an authorization level that exceeds the associated authorization level.

20 Claims, 6 Drawing Sheets

Related U.S. Application Data continuation of application No. 14/816,271, filed on Aug. 3, 2015, now Pat. No. 9,652,629, which is a continuation of application No. 13/245,061, filed on Sep. 26, 2011, now Pat. No. 9,100,413, which is a continuation of application No. 12/016,723, filed on Jan. 18, 2008, now Pat. No. 8,056,143.

(60) Provisional application No. 60/885,796, filed on Jan. 19, 2007.

(51) Int. Cl.
*H04W 12/02* (2009.01)
*G06F 21/60* (2013.01)
*G06F 21/88* (2013.01)
*H04W 12/08* (2009.01)
*H04W 12/00* (2009.01)

(52) U.S. Cl.
CPC .......... *G06F 21/88* (2013.01); *H04L 63/0428* (2013.01); *H04L 63/101* (2013.01); *H04L 63/105* (2013.01); *H04W 12/0013* (2019.01); *H04W 12/02* (2013.01); *H04W 12/08* (2013.01); *G06F 2221/2107* (2013.01); *G06F 2221/2113* (2013.01); *G06F 2221/2143* (2013.01)

(56) References Cited

U.S. PATENT DOCUMENTS

| | | | |
|---|---|---|---|
| 5,150,407 A | 9/1992 | Chan | |
| 5,265,159 A | 11/1993 | Kung | |
| 5,748,084 A | 5/1998 | Isikoff | |
| 5,901,285 A | 5/1999 | Labatte et al. | |
| 5,987,609 A | 11/1999 | Hasebe | |
| 6,160,873 A | 12/2000 | Troung et al. | |
| 6,167,253 A | 12/2000 | Farris et al. | |
| 6,167,519 A | 12/2000 | Sonobe | |
| 6,236,971 B1 | 5/2001 | Stefik et al. | |
| 6,292,898 B1 | 9/2001 | Sutherland | |
| 6,513,120 B2 | 1/2003 | Kanzawa et al. | |
| 7,028,193 B1 | 4/2006 | Slater et al. | |
| 7,113,912 B2 | 9/2006 | Stefik et al. | |
| 7,159,120 B2 | 1/2007 | Muratov et al. | |
| 7,197,297 B2 | 3/2007 | Myles et al. | |
| 7,197,638 B1 | 3/2007 | Grawrock et al. | |
| 7,216,110 B1 | 5/2007 | Ogg et al. | |
| 7,304,570 B2 | 12/2007 | Thomas et al. | |
| 7,308,703 B2 | 12/2007 | Wright et al. | |
| 7,343,488 B2 | 3/2008 | Yadav | |
| 7,430,671 B2 | 9/2008 | Graves et al. | |
| 7,441,264 B2 | 10/2008 | Himmel et al. | |
| 7,512,792 B2 | 3/2009 | Arroyo et al. | |
| 7,543,160 B2 | 6/2009 | Adams et al. | |
| 7,577,986 B2 | 8/2009 | Himmel et al. | |
| 7,647,630 B2 | 1/2010 | Arroyo et al. | |
| 7,657,531 B2 | 2/2010 | Bisbee et al. | |
| 7,665,125 B2 | 2/2010 | Heard et al. | |
| 7,665,146 B2 | 2/2010 | Munje et al. | |
| 7,669,051 B2 | 2/2010 | Redlich et al. | |
| 7,735,116 B1 | 6/2010 | Gauvin | |
| 7,788,487 B2 | 8/2010 | Ito et al. | |
| 7,894,796 B2 | 2/2011 | Karaoguz et al. | |
| 7,975,295 B2 | 7/2011 | Arroyo et al. | |
| 8,012,219 B2 | 9/2011 | Mendez et al. | |
| 8,024,565 B2 | 9/2011 | Arroyo et al. | |
| 8,042,189 B2 | 10/2011 | Little et al. | |
| 8,056,143 B2 | 11/2011 | Brown et al. | |
| 8,074,287 B2 | 12/2011 | Barde et al. | |
| 8,126,434 B2 | 2/2012 | Karaoguz et al. | |
| 8,140,863 B2 | 3/2012 | Brown et al. | |
| 8,176,320 B1 | 5/2012 | Belanger et al. | |
| 8,254,883 B2 | 8/2012 | Uchida | |
| 8,676,273 B1 | 3/2014 | Fujisaki | |
| 8,696,765 B2 | 4/2014 | Mendez et al. | |
| 9,083,707 B2 | 7/2015 | Mendez et al. | |
| 9,672,371 B2 | 6/2017 | Mendez et al. | |
| 9,965,643 B2 | 5/2018 | Mendez et al. | |
| 2001/0045884 A1 | 11/2001 | Barrus et al. | |
| 2002/0002685 A1 | 1/2002 | Shim | |
| 2002/0062449 A1 | 5/2002 | Perna et al. | |
| 2002/0066034 A1 | 5/2002 | Schlossberg et al. | |
| 2002/0143961 A1 | 10/2002 | Siegel et al. | |
| 2003/0023561 A1 | 1/2003 | Stefik et al. | |
| 2003/0097596 A1 | 5/2003 | Muratov et al. | |
| 2003/0139175 A1* | 7/2003 | Kim | H04L 69/16 455/419 |
| 2003/0149662 A1 | 8/2003 | Shore | |
| 2003/0162555 A1 | 8/2003 | Loveland | |
| 2003/0191955 A1 | 10/2003 | Wagner et al. | |
| 2003/0200454 A1 | 10/2003 | Foster et al. | |
| 2004/0025053 A1 | 2/2004 | Hayward | |
| 2004/0123153 A1* | 6/2004 | Wright | G06F 21/32 726/1 |
| 2004/0124975 A1 | 7/2004 | Fujiwara et al. | |
| 2004/0177270 A1 | 9/2004 | Little et al. | |
| 2004/0181673 A1 | 9/2004 | Lin et al. | |
| 2005/0005131 A1* | 1/2005 | Yoshida | G06F 21/31 713/183 |
| 2005/0039001 A1 | 2/2005 | Hudis et al. | |
| 2005/0048951 A1 | 3/2005 | Saito | |
| 2005/0138109 A1* | 6/2005 | Redlich | G06F 21/554 709/201 |
| 2005/0186954 A1* | 8/2005 | Kenney | H04M 1/67 455/420 |
| 2005/0222933 A1* | 10/2005 | Wesby | G06Q 40/00 705/36 R |
| 2005/0227729 A1* | 10/2005 | Nakayama | H04M 1/275 455/558 |
| 2005/0278793 A1 | 12/2005 | Raley et al. | |
| 2006/0021007 A1* | 1/2006 | Rensin | G06F 21/313 726/2 |
| 2006/0080494 A1 | 4/2006 | Kawaguchi et al. | |
| 2006/0125112 A1 | 6/2006 | Ikeya et al. | |
| 2006/0236126 A1 | 10/2006 | Adams et al. | |
| 2006/0265328 A1 | 11/2006 | Yasukura | |
| 2006/0277341 A1 | 12/2006 | Johnson | |
| 2007/0015490 A1* | 1/2007 | Munje | H04M 1/66 455/410 |
| 2007/0035390 A1 | 2/2007 | Thomas et al. | |
| 2007/0056043 A1* | 3/2007 | Onyon | G06F 21/88 726/26 |
| 2007/0094463 A1 | 4/2007 | Brown et al. | |
| 2007/0094471 A1 | 4/2007 | Shaath et al. | |
| 2007/0143601 A1 | 6/2007 | Arroyo et al. | |
| 2007/0143839 A1 | 6/2007 | Chen et al. | |
| 2007/0157322 A1 | 7/2007 | Onno | |
| 2007/0199075 A1 | 8/2007 | Skoric et al. | |
| 2007/0204324 A1* | 8/2007 | Roberts | G06F 21/31 726/1 |
| 2007/0266422 A1* | 11/2007 | Germano | H04L 63/0263 726/1 |
| 2008/0113649 A1* | 5/2008 | Ibacache | H04L 9/00 455/410 |
| 2008/0141337 A1* | 6/2008 | Yeung | G06F 21/6245 726/1 |
| 2008/0148042 A1* | 6/2008 | Brown | H04L 63/0442 713/154 |
| 2008/0178300 A1 | 7/2008 | Brown et al. | |
| 2009/0036157 A1 | 2/2009 | Mackie | |
| 2010/0317324 A1 | 12/2010 | Brown et al. | |
| 2010/0325736 A1 | 12/2010 | Sadovsky et al. | |
| 2011/0004941 A1 | 1/2011 | Mendez et al. | |
| 2011/0238984 A1 | 9/2011 | Roush et al. | |
| 2012/0079603 A1 | 3/2012 | Brown et al. | |

(56) References Cited

U.S. PATENT DOCUMENTS

2013/0031595 A1 1/2013 Nevstruev et al.
2013/0091564 A1 4/2013 Fitzgerald et al.

FOREIGN PATENT DOCUMENTS

| EP | 0836191 | 4/1998 |
| EP | 0899647 | 3/1999 |
| EP | 1320010 | 6/2003 |
| EP | 1535159 B1 | 1/2005 |
| EP | 1585007 | 10/2005 |
| EP | 1633155 | 3/2006 |
| EP | 2375336 B1 | 6/2013 |
| EP | 2955896 B1 | 10/2017 |
| WO | 2004001619 | 12/2003 |
| WO | 2004015576 | 2/2004 |
| WO | 2006044746 | 4/2006 |
| WO | 2006125112 | 11/2006 |

OTHER PUBLICATIONS

Brown et al.: "Mastering Lotus Notes", 1995, Lotus Books, Lotus Development Corporation, 1028 pgs.

Menezes et al.: "Hash Functions and Data Integrity" Jan. 1, 1997, Handbook of Applied Cryptography; [CRC Press Series on Discrete Mathematics and its Applications], pp. 321-323, XP002275660.

EPO, Supplementary Extended European Search Report, relating to EP application No. 8706234, dated Mar. 12, 2010.

EPO, EP Examination Report relating to EP application No. 8706234, dated Oct. 28, 2010.

EPO, EP Examination Report relating to EP application No. 8706234.5, dated Aug. 8, 2012.

USPTO, U.S. Office Action relating to U.S. Appl. No. 13/245,061, dated Jan. 22, 2015.

EPO, EP Office Action relating to EP application No. 12190992.3, dated May 8, 2018.

USPTO, U.S. Office Action relating to U.S. Appl. No. 14/816,271, dated May 12, 2016.

USPTO, U.S. Final Office Action relating to U.S. Appl. No. 14/816,271, dated Sep. 28, 2016.

EPO, EP Office Action relating to EP application No. 12190992.3, dated Feb. 8, 2017.

EPO, Extended European Search Report relating to EP application No. 12190992.3, dated Feb. 13, 2013.

EPO, Replacement Extended European Search Report relating to EP application No. 12190992.3, dated Mar. 4, 2013.

CIPO, CA Office Action relating to CA application No. 2,676,289, dated Jan. 13, 2017.

\* cited by examiner

PasswordRequired = True
MaxSecurityTimeout = 15
UserCanChangeTimeout = False
AllowPINtoPIN = False
AllowVoiceCalling = False
PasswordAttemptLimit = 5
PIMMessageDataWipeMinLevel = 0
UserDataWipeMinLevel = 0
ITPolicyWipeMinLevel = 4
ThirdPartyAppWipeMinLevel = 0
PIMMessageAppWipeMinLevel = 2
KeyDataWipeMinLEvel = 2
```

PasswordRequired = True
MaxSecurityTimeout = 15
UserCanChangeTimeout = False
AllowPINtoPIN = False
AllowVoiceCalling = False
PasswordAttemptLimit = 5
DataWipeAuthLevel0 = 00000000000000
DataWipeAuthLevel1 = 00000000111100
DataWipeAuthLevel2 = 00000011111100
DataWipeAuthLevel4 = 00111111111111
```

Administrator – Help Desk

Users

| Name | DeviceID | Status | Last Contact Time | 610 |
|---|---|---|---|---|
| Rob Bender | AE0003C5 | Running | 20061131 00:31:23 | |
| Amy Wong | AC56000E | Running | 20061203 12:01:33 | |
| Phil Fry | 3E005600 | Running | 20061203 18:34:00 | |

Erase Data and Disable Handheld
This will send a command to Amy Wong's device to erase selected previously stored information.

Select data categories to be erased:
☑ Message data
☑ Calendar data     680
☑ Address Book data
☑ Other user-created data
☐ PIM/messaging applications
☐ Third-party applications
☐ *Encryption keys (will be prompted to reset)*
☐ *IT Policy*

Are you sure you want to do this?
[ Yes ]  [ No ]

Options
620  Assign IT Policy
     Reset Master Key
     Set Password and Lock Handheld
     Erase Data and Disable Handheld
     Remove User

Administrator – Security

Users

| Name | DeviceID |
|---|---|
| Rob Bender | AE0003C5 |
| Amy Wong | AC56000E |
| Phil Fry | 3E005600 |

Mailbox: o=daystrom/cn=aw
Mail Server: M5
IT Policy Name: a_wong_itpol
IT Policy Status: Applied Successful
Last IT Policy Update: 20061123 15:22:04

Erase Data and Disable Handheld
This will send a command to Hugh Farnsworth's device to erase selected previously stored information.

Select data categories to be erased:
☑ Message data
☑ Calendar data     690
☑ Address Book data
☑ Other user-created data
☐ PIM/messaging applications
☐ Third-party applications
☑ Encryption keys (will be prompted to reset)
☑ IT Policy Are you sure you want to do this?
[ Yes ]  [ No ]

Figure 8b

Configure wipe permissions
Set the data categories to be erased by each authorization level:

| Authorization Level | 0 | 1 | 2 | 3 | 4 |
|---|---|---|---|---|---|
| Message data | ☐ | ✓ | ✓ | ✓ | ✓ |
| Calendar data | ☐ | ✓ | ✓ | ✓ | ✓ |
| Address Book data | ☐ | ☐ | ✓ | ✓ | ✓ |
| User-created data | ☐ | ☐ | ✓ | ✓ | ✓ |
| PIM/messaging apps | ☐ | ☐ | ☐ | ✓ | ✓ |
| Third-party apps | ☐ | ☐ | ☐ | ✓ | ✓ |
| Encryption keys | ☐ | ☐ | ☐ | ☐ | ✓ |
| IT Policy | ☐ | ☐ | ☐ | ☐ | ✓ |

[ Save ]  [ Cancel ]

Configure wipe permissions
Set the data categories to be erased by each authorization level:

| Authorization Level | 0 | 1 | 2 | 3 | 4 |
|---|---|---|---|---|---|
| Message data | ☐ | ✓ | ✓ | ✓ | ✓ |
| Calendar data | ☐ | ✓ | ✓ | ✓ | ✓ |
| Address Book data | ☐ | ☐ | ✓ | ✓ | ✓ |
| User-created data | ☐ | ☐ | ☐ | ✓ | ✓ |
| PIM/messaging apps | ☐ | ☐ | ☐ | ✓ | ✓ |
| Third-party apps | ☐ | ☐ | ☐ | ✓ | ✓ |
| Encryption keys | ☐ | ☐ | ☐ | ☐ | ✓ |
| IT Policy | ☐ | ☐ | ☐ | ☐ | ✓ |

713
711

[ Save ]  [ Cancel ]

Configure wipe permissions
Set the data categories to be erased by each authorization level:

| Authorization Level | 0 | 1 | 2 | 3 | 4 |
|---|---|---|---|---|---|
| Message data | ☐ | ✓ | ✓ | ✓ | ✓ |
| Calendar data | ☐ | ✓ | ✓ | ✓ | ✓ |
| Address Book data | ☐ | ✓ | ✓ | ✓ | ✓ |
| User-created data | ☐ | ☐ | ☐ | ✓ | ✓ |
| PIM/messaging apps | ☐ | ☐ | ☐ | ✓ | ✓ |
| Third-party apps | ☐ | ☐ | ☐ | ✓ | ✓ |
| Encryption keys | ☐ | ☐ | ☐ | ☐ | ✓ |
| IT Policy | ☐ | ☐ | ☐ | ☐ | ✓ |

722
713
711

[ Save ]  [ Cancel ]

SELECTIVELY WIPING A REMOTE DEVICE

REFERENCE TO PRIOR APPLICATIONS

This application is a continuation of U.S. application Ser. No. 15/475,901, filed on Mar. 31, 2017, which is a continuation of U.S. application Ser. No. 14/816,271, filed Aug. 3, 2015, which is a continuation of U.S. application Ser. No. 13/245,061, filed Sep. 26, 2011, which is a continuation of U.S. application Ser. No. 12/016,723, filed Jan. 18, 2008, which claims priority from U.S. Application No. 60/885,796, filed Jan. 19, 2007, the entireties of which are incorporated herein by reference.

BACKGROUND

1. Technical Field

The present disclosure relates generally to the field of computer and network security, and more particularly, to wiping data stored on a remote device such as a mobile communication device.

2. Description of the Related Art

Data stored in the memory of a communication and/or computing device, such as a mobile communication device, personal digital assistant (PDA), smartphone, laptop computer, and the like, may include data of a sensitive or critical nature that is accessible only by authorized users. Such data may include e-mail, calendar information, contact information in an address book, and other information that may be utilized, received, or transmitted by or from the communication device in the execution of communication-related or productivity-related applications. The data may further include applications, or data files created at the device or received by an authorized user at the device that are personal to the user, or that are used by the device for the management of data and/or security functions on the communication device. Such data includes information technology (IT) policies, which may comprise rules concerning a variety of security and management-related issues, such as user authorization to use certain functions or install software on the communication device, encryption algorithms in wireless communication, and authentication processes to be employed before allowing user access to data on the device, for example if an authentication token such as a smart card is required.

BRIEF DESCRIPTION OF THE DRAWINGS

Embodiments of the inventive aspects of this disclosure will be best understood with reference to the following detailed description, when read in conjunction with the accompanying drawings, in which.

DETAILED DESCRIPTION OF THE INVENTION

While data may be protected by requiring the user to enter a valid password in order to access applications or data on the device, or by encrypting data stored on the device such that access to the data requires decryption by a valid decryption key, there are instances when the device may be compromised, decommissioned, or redeployed, making it desirable to delete or "wipe" data, including applications, on the communication device so that it cannot be accessed by unauthorized or malicious users. However, it may not always be necessary or desirable to wipe all data and applications from a device.

Therefore, it is desirable to provide a system and method for selectively wiping data at a communication device. Thus, as described herein, there is provided a method for selectively securing data from unauthorized access on a client device storing a plurality of data types, the method comprising receiving a command at the client device, the command comprising an indicator of an authorization level, wherein the authorization level is associated with an issuer of the command; determining which of a plurality of data types is to be secured by identifying a predefined rule associated with the authorization level indicated in the received command, wherein the client device is provided with a plurality of predefined rules each associated with one of a plurality of authorization levels, each of the predefined rules comprising a value indicating each of the plurality of data types to be secured in response to a received command; and securing the data of the data types indicated by the value comprised in the identified predefined rule.

In a further aspect, determining which of a plurality of data types is to be secured further comprises, when a predefined rule associated with the authorization level indicated in the received command is not found, identifying a predefined rule associated with the next highest authorization level that is lower than the indicated authorization level. In still a further aspect, the plurality of predefined rules is stored at the client device in association with an IT policy. In another aspect, securing the data further comprises setting a flag at the client device, the flag comprising a subset value for each of the plurality of data types, the subset value indicating whether the data of that data type is to be secured; in response to the received command, checking each of the subset values of the flag, and carrying out a securing operation if the subset value indicates that the data of that data type is to be secured; and after each of the subset values has been checked, resetting the subset values to indicate that no further securing operation is to be carried out. In yet a further aspect, securing the data comprises one of deleting the data; encrypting the data; or encrypting, then deleting, the data. The securing operation may comprise one of deleting the data of that data type; encrypting the data of that data type; and encrypting, then deleting, the data of that data type. In a further aspect, the command is received in an encrypted message, and prior to securing the data the command is authenticated by decrypting the message and extracting the command, such that the command is authenticated if the command is extracted successfully. The client device may comprise a mobile communications device, and the command may be received over the air, or received from input at the client device, or received as detection of a predetermined action, condition or trigger for the execution of the wipe command at the client device. In yet a further aspect, prior to receiving the command at the client device, the method may comprise defining, at a location remote from the client device, a plurality of predefined rules associated with an authorization level; and transmitting to the client device the plurality of predefined rules thus defined. Defining the plurality of predefined rules may comprise, for a given authorization level, presenting a set of configuration options for configuring securing operations for each of the plurality of data types for authorization levels lower than the given authorization level; and constructing a plurality of rules comprising selected configuration options. The data types may comprise at least one of an operating system, encryption and decryption keys, personal information management applications, messaging applications, e-mail data, short message service data, instant messaging data, multimedia message data, voicemail data, calendar data, address book data, or IT policies.

There is further provided a computer readable memory having recorded thereon statements and instructions for execution by a computer to receive a command at the client device, the command comprising an indicator of an authorization level, wherein the authorization level is associated with an issuer of the command; determine which of a plurality of data types is to be secured by identifying a predefined rule associated with the authorization level indicated in the received command, wherein the client device is provided with a plurality of predefined rules each associated with one of a plurality of authorization levels, each of the predefined rules comprising a value indicating each of the plurality of data types to be secured in response to a received command; and secure the data of the data types indicated by the value comprised in the identified predefined rule.

In a further embodiment, there is provided a method for selectively securing data from unauthorized access on a client device storing a plurality of data types, the method comprising receiving a command at the client device, the command comprising an indicator of an authorization level, wherein the authorization level is associated with an issuer of the command; determining which of the plurality of data types is to be secured by identifying each of a plurality of predefined rules comprising an indicator of an authorization level equal to or less than the authorization level indicated in the received command, each of the plurality of predefined rules being associated with one of the plurality of data types; and securing only the data corresponding to each of the plurality of data types associated with the predefined rules thus identified. In a further aspect, securing the data further comprises setting a flag at the client device, the flag comprising a subset value for each of the plurality of data types, the subset value indicating whether the data of that data type is to be secured; in response to the received command, checking each of the subset values of the flag, and carrying out a securing operation if the subset value indicates that the data of that data type is to be secured; and after each of the subset values has been checked, resetting the subset values to indicate that no further securing operation is to be carried out. In another aspect, securing the data comprises one of deleting the data; encrypting the data; or encrypting, then deleting, the data.

In still a further aspect, there is provided computer readable memory having recorded thereon statements and instructions for execution by a computer to receive a command at the client device, the command comprising an indicator of an authorization level, wherein the authorization level is associated with an issuer of the command; determine which of the plurality of data types is to be secured by identifying each of a plurality of predefined rules comprising an indicator of an authorization level equal to or less than the authorization level indicated in the received command, each of the plurality of predefined rules being associated with one of the plurality of data types; and secure only the data corresponding to each of the plurality of data types associated with the predefined rules thus identified.

In yet a further embodiment, there is provided a mobile client device for selectively securing data from unauthorized access on the client device storing a plurality of data types, the device comprising a processor; a memory storing data comprising at least one of a plurality of data types; and a receiver operatively connected to the processor for receiving a command at the client device, the command comprising an indicator of an authorization level, wherein the authorization level is associated with an issuer of the command; wherein the processor is configured to determine, using at least one predefined rule associated with the authorization level indicated by the authorization level indicator, which of a plurality of data types is to be secured and to secure the data stored in the memory corresponding to each of the plurality of data types thus determined. In a further aspect, each of the predefined rules is associated with one of a plurality of authorization levels, and each of the predefined rules comprises a value indicating each of the plurality of data types to be secured in response to a received command, and wherein the processor is further configured to identify the predefined rule associated with the authorization level indicated in the received command, and to secure only those data types indicated by the value comprised in the identified predefined rule. In still a further aspect, the device further comprises a memory for storing a flag comprising a subset value for each of the plurality of data types, the subset value indicating whether the data of that data type is to be secured, the processor being further configured to set the flag; in response to the received command, check each of the subset values of the flag, and carry out a securing operation if the subset value indicates that the data of that data type is to be secured; and after each of the subset values has been checked, reset the subset values to indicate that no further securing operation is to be carried out. The processor may be configured to secure the data by deleting the data corresponding to each of the plurality of data types thus determined from the memory, or to secure the data by encrypting the data corresponding to each of the plurality of data types thus determined in the memory. Further, in another aspect, the command may be received in an encrypted message, and the processor is configured to decrypt the message and extract the command, such that the command is authenticated if the command is extracted successfully.

Figure 1:
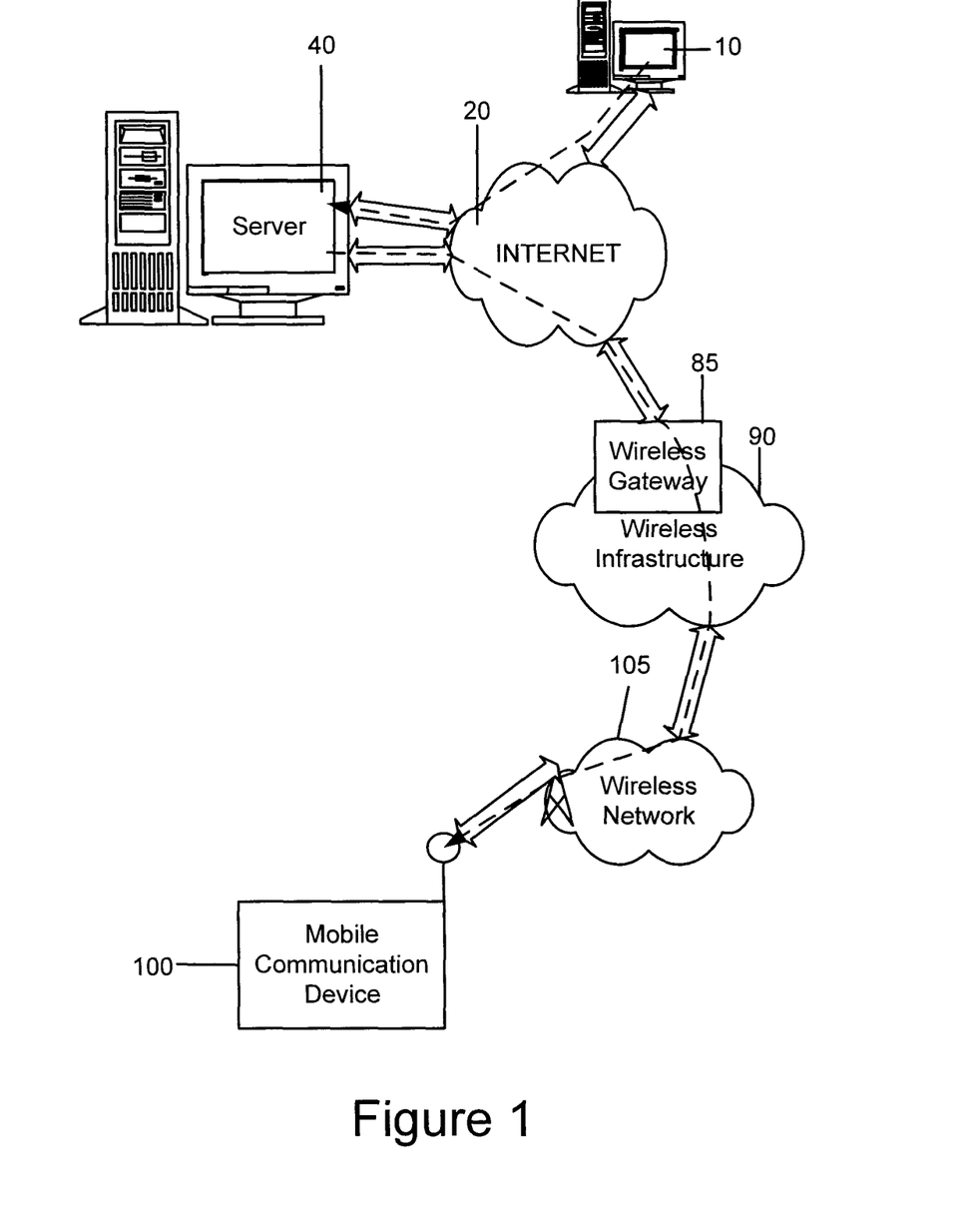
FIG. 1 is a schematic of a network for implementing a system and method of preventing access to data.

Referring to FIG. 1, an overview of an exemplary communication system for use with the embodiments described below is shown. One skilled in the art will appreciate that there may be many different topologies, but the system shown in FIG. 1 helps demonstrate the operation of the systems and methods described in the present application. There may be many communication devices connected to the system that are not shown in the simple overview of FIG. 1.

FIG. 1 shows first communication device, here a client personal computer 10, a network, here the Internet 20, a server system 40, a wireless gateway 85, wireless infrastructure 90, a wireless network 105 and a second communication device, here a client mobile communication device 100. It will be appreciated by those skilled in the art that the devices referred to herein as client devices, personal computers, mobile devices, mobile communication devices, communication devices, computing devices, or data storage devices may comprise devices whose main function is directed to data or voice communication over a network and data storage, but may also be provided with personal or productivity applications, or devices whose main function is directed to computing or executing productivity applications, but are also adapted to enable a user to communicate over a network. Such devices include, but are not limited to, laptop and notebook computers, PDAs, smartphones, and the like. The client device is capable of communicating over a wireless network, as set out in further detail below.

A client personal computer 10 may, for example, be connected to an ISP (Internet Service Provider) on which a user of the system has an account, located within a company, possibly connected to a local area network (LAN), and connected to the Internet 20, or connected to the Internet 20 through a large ASP (application service provider). Those skilled in the art will appreciate that the systems shown in FIG. 1 may instead be connected to a wide area network (WAN) other than the Internet.

The wireless gateway 85 and infrastructure 90 provide a link between the Internet 20 and wireless network 105. The wireless infrastructure 90 determines the most likely network for locating a given user and tracks the user as they roam between countries or networks. Messages and other data may be delivered to the client mobile device 100 via wireless transmission, typically at a radio frequency (RF), from a base station in the wireless network 105 to the client mobile device 100. The particular network 105 may be any wireless network over which messages may be exchanged with a mobile communication device. The client mobile device 100 may also receive data by other means, for example through a direct connection to a port provided on the mobile device 100, such as a Universal Serial Bus (USB) link.

The server system 40 may be implemented, for example, on a network computer within the firewall of a corporation, a computer within an ISP or ASP system or the like. The server system 40 may act as the application, network access, and/or file server for one or more communication devices. In the embodiment described below, the server system 40 also acts as an authoritative server for managing IP policies and issuing software and security-related commands to the client devices 10, 100. The mobile device 100, if it is configured for receiving and possibly sending e-mail, may be associated with an account on the server system 40. The software products and other components that are often used in conjunction with the functions of the server system 40 described herein are not shown in FIG. 1, as they do not directly play a role in the system and method described below. If the server system 40 acts as a message server, the server system 40 may support either a so-called "pull" or "push" message access scheme, wherein the mobile device 100 requests that stored messages be forwarded by the message server to the mobile device 100 ("pull"), or the server system 40 may be provided with means for automatically redirecting messages addressed to the user of the mobile device 100 as they are received ("push").

The server system 40 may be used to provide administrative functions for the client devices 10 and 100, for example by establishing and transmitting information technology (IT) policies. In accordance with various embodiments, administrator access is provided at the server system 40 for issuing various commands relating to the management and security features of the client devices 10, 100, although the system and method described herein may be implemented from another device on the network, if such administrator-level access is provided at the other device. For ease of reference, the various administrative functions and registration of client devices at a server will be described with reference to the server system 40. The system of FIG. 1 may be configured to provide for multiple levels of administrator-level access; for example, the system of FIG. 1 may be implemented for use with an organization or institution mandating multiple levels of security authorization and IT support. The IT support roles may comprise "help desk" support, which is authorized to provide a first set of administrator and IT support services to users of client devices 10, 100 such as application support and certain security-related support such as resetting passwords, but is not authorized to provide certain higher-level administrator functions relating to more sensitive security issues; and "security" IT support with a higher level of authorization for providing a second set of administrator and IT support services to the users of the client devices 10, 100, such as deploying and redeploying client devices 10, 100, configuring security protocols at and between the client devices 10, 100 and the server 40, and other functions that may require a greater level of knowledge, certification, trust, or security clearance to implement or configure. The level of authorization provided to particular support or administrative personnel may be determined by the server 40 in accordance with a predetermined IT policy when the individual support person logs into the server 40; upon login, the server 40 may look up the individual's administrative authorization level, and provide the individual with access to the functions commensurate with his or her authorization level.

Typically, and particularly in the instance where the client device is a communication device 100 such as a smartphone, PDA, or laptop or other mobile computer, a single user is designated as the authorized user of the client device 10, 100, although more than one user may be authorized to use the client device 10, 100, particularly if the device is a networked desktop computer or other non-mobile device. Depending on the IT policy configured on that client device 10, 100, the user of the device may have access to a varied set of functions on the device. For example, in the case of a smartphone or other client device 10, 100 capable of voice and/or SMS communication, the voice and/or SMS functions may be disabled. While one method of disabling a function is to delete or simply not install the portion of the device's applications or operating system relating to this function, this may not be feasible or desirable. Instead, the availability of the function may be determined by the IT policy configured for that device. Furthermore, users may be granted varying levels of access to configure or use the functions of the same client device 10, 100. Some users may only be provided with access to previously installed application programs, and may not have sufficient authority to install further applications, and may only be provided with access to a portion of the data stores of the client device 10, 100. Other users, with a higher level of authorization, may possess sufficient authority to install applications, access secure data such as data stored in memory locations generally designated as inaccessible to typical users at the client device, and alter selected security settings. The level of access afforded to the users of the client device 10, 100, again, may be determined by an IT policy configured for that device. The IT policy may be consulted by the client device 10, 100 upon user login to determine the level of access to be granted to the user, and is stored at the client device 10, 100 rather than only at the server 40; in the event that a user logs into the client device 10, 100 while it is disconnected from the network 20, 105, the IT policy will still be available to the client device 10, 100.

Figure 2:
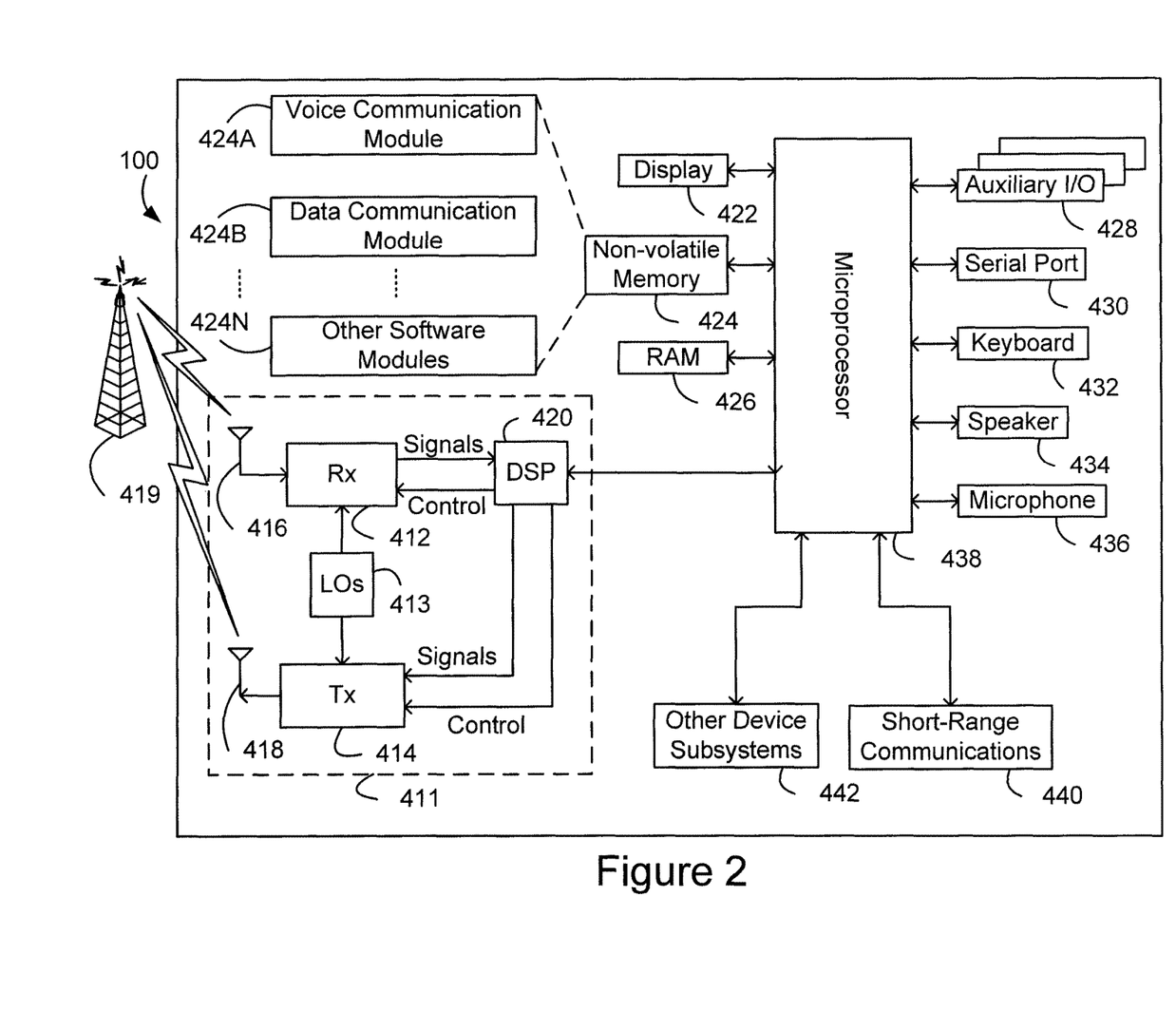
FIG. 2 is a block diagram of a mobile communication device for use with the network of FIG. 1.
Figure 3:
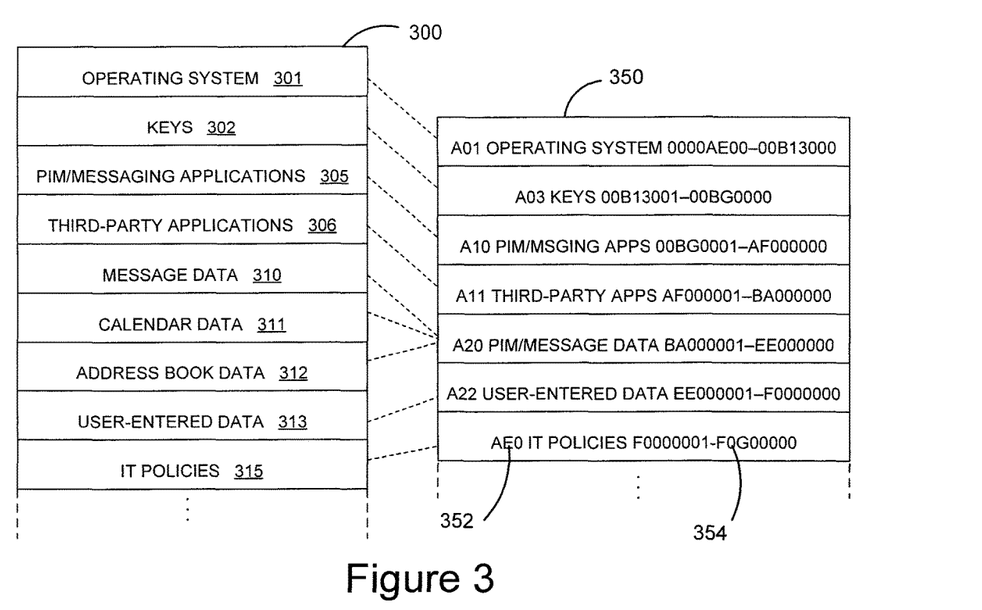
FIG. 3 is a schematic representation of data stored in a memory store of a communication device.
Figure 4A:
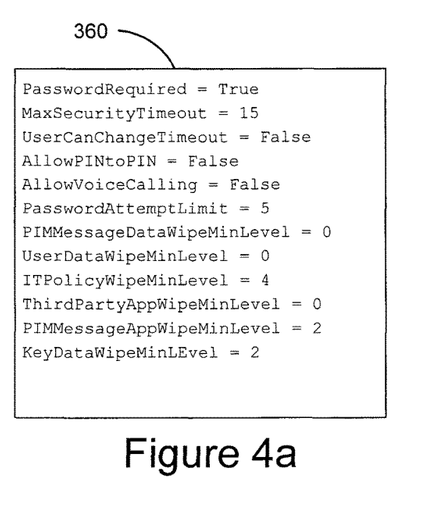
FIG. 4a is a schematic representation of data that may be incorporated into an exemplary IT policy.

The client device 10, 100 may store data in an erasable persistent memory. In the case of a mobile device this may be flash memory. With reference to FIG. 2, which depicts one embodiment of a mobile communication device 100 and is described in detail below, data may be stored in non-volatile memory 424. The data stored on the client device 10, 100 may comprise user application data, for example e-mail messages, address book data, contact information, calendar appointments and associated information, text files, image files, and other data generated by either the user at the client device 10, 100, or received and stored by the communication device 100. Referring to FIG. 3, a schematic representation of the data stored at the client device 10, 100 is shown. The data store of the communication device, here represented as 300, may be comprised in the non-volatile memory 424, and may comprise different types of data such as an operating system 301; keys 302, which may generally include encryption and decryption keys and addressing information for use in communicating between the communication device and the server 40; personal information management (PIM) applications and messaging applications 305; third-party applications that may have been installed by the user or an administrator 306; message/PIM data, such as e-mail data, short message service (SMS) data, IM data, multimedia message data, and voicemail data 310, calendar data 311, and address book data 312; other user-entered data 313; and IT policies 315. The message/PIM data 310 may comprise one or more of the various types of e-mail data and other data 310-312. Voicemail data 310 may comprise digitized audio recordings, or may comprise a stub entry available for viewing in a messaging application indicating the availability of a voicemail message stored at another location. The user-entered data 313 may comprise text-based, graphic, or other multimedia files loaded onto the communication device 100 by the user. The various types of data 301 through 315 may be provided in whatever data format is best suited for the purpose. IT policy data 315 may be in a human-readable format, but may also be stored in a binary format. FIG. 4, discussed in more detail below, provides an example of the nature of the information that may be represented by IT policy data 315.

The systems and methods disclosed herein may be used with many different computers and devices, such as a wireless mobile communications device shown in FIG. 2. With reference to FIG. 2, the communication device 100 may comprise a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and may be embedded antennas. However, the systems and methods described herein are in no way restricted to a particular type of antenna, or even to wireless communication devices.

The communication device 100 may comprise a two-way communication device having voice and data communication capabilities. Thus, for example, the communication device 100 may communicate over a voice network, such as any of the analog or digital cellular networks, and may also communicate over a data network. The voice and data networks are depicted in FIG. 2 by the communication tower 419. These voice and data networks may be separate communication networks using separate infrastructure, such as base stations, network controllers, etc., or they may be integrated into a single wireless network.

The transceiver 411 is used to communicate with the network 319, and includes the receiver 412, the transmitter 414, the one or more local oscillators 313 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 311 via a link between the DSP 420 and the microprocessor 438.

The detailed design of the transceiver 411, such as frequency band, component selection, power level, etc., will be dependent upon the communication network 419 in which the mobile device 100 is intended to operate. The voice and data networks 419 may be separate voice networks and separate data networks, or may comprise integrated voice and data networks. It will be appreciated by those skilled in the art that these embodiments may be implemented on a variety of voice and data communication networks 419, including, but not limited to, 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

Depending upon the type of network or networks 419, the access requirements for the communication device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically uses a subscriber identity module SIM, which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the communication device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 manages and controls the overall operation of the communication device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the communication device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 2 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 may be stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the communication device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the flash memory 424.

The non-volatile memory 424 provides a file system to facilitate storage of PIM data items on the device. The PIM application includes the ability to send and receive data items, either by itself, or in conjunction with the voice and data communication modules 424A, 424B, via the wireless networks 419. The PIM data items are seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are stored on the communication device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store ensures that the information is erased from memory when the communication device 100 loses power. This prevents an unauthorized party from obtaining any stored decoded or partially decoded information by removing a memory chip from the communication device 100, for example.

The communication device 100 may be manually synchronized with a host system by placing the device 100 in an interface cradle, which couples the serial port 430 of the communication device 100 to the serial port of a computer system or device. The serial port 430 may also be used to enable a user to set preferences through an external device or software application, or to download other application modules 324N for installation. This wired download path may be used to load an encryption key onto the device, which is a more secure method than exchanging encryption information via the wireless network 419.

A short-range communications subsystem 440 is also included in the communication device 100. The subsystem 440 may include an infrared device and associated circuits and components, or a short-range RF communication module such as a BLUETOOTH® module or an 802.11 module, for example, to provide for communication with similarly-enabled systems and devices. Those skilled in the art will appreciate that "BLUETOOTH" and "802.11" refer to sets of specifications, available from the Institute of Electrical and Electronics Engineers, relating to wireless personal area networks and wireless local area networks, respectively.

Returning to FIG. 3, in accordance with various embodiments the data is stored in a manner such that either the location of the various types of data 301-315 is tracked, or that the type of data stored in the memory 300 may be determined by querying a data table, represented by the schematic 350. For example, the data table may comprise a look-up reference correlating each type of data with one or more memory address ranges 354. Thus, it can be seen that in FIG. 3, any IT policy data is stored in memory location addresses F0000001 through F0G00000. If the client device 10, 100 is configured such that predetermined ranges of memory addresses are allocated to different types of data, it will be understood that the full range of memory addresses may not be utilized if only a portion of the memory allowance is required; also, the data may not be stored at consecutive memory addresses. Further, if the memory address ranges allocated to the various types of data are not predetermined, it will be understood that each type of data may not actually be stored in contiguous memory blocks; thus, a data table 350 may comprise multiple memory address ranges as necessary in order to track the locations of each data type 301-315. Alternatively, or in addition to the recording of corresponding memory address ranges 354, each data type may be correlated with a further tag or label 352, and the data stored in the memory store 300 may be stored with associated tags 352, such that the store 300 can be scanned to identify all data blocks associated with a given tag 352.

Figure 4B:
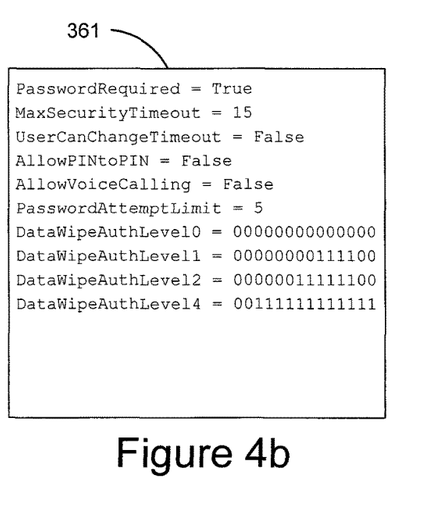
FIG. 4b is a further schematic representation of data that may be incorporated into an exemplary IT policy.

As noted above, an IT policy may be stored at the client device 10, 100 in a binary format. The content of the IT policy, which may be described as a set of predefined rules, may be configurable at the server 40 by a user or administrator vested with sufficient access privileges or security clearance, and is transmitted from the server 40 to the client device 10, 100. Configuration of the IT policy at the server 40 may be carried out by means of a graphical user interface (not shown); in another embodiment, the IT policy may be composed as a text file, and then stored as an IT policy file at the client device 10, 100. FIGS. 4a and 4b depict some exemplary contents of an IT policy 360, 361, illustrated in human-readable form for ease of reference. The policy may consist of a series of key-value pairs, wherein the key defines a characteristic controlled by the IT policy, and the corresponding value is alterable by an administrator with sufficient administrator access to alter the policy 360, or by an administrator with sufficient administrator access to alter a subset of the policy 360 that includes the key corresponding to the value to be changed. An example of a key-value pair in the exemplary IT policy is PasswordRequired=True; in this example, PasswordRequired corresponds to a rule that may be enacted by a security module executable on the device 10, 100 that a password must be entered by a user before access to the functions of the device is granted; and the value set as True means that the rule is in force when this IT policy 360 is applied. Another exemplary rule depicted in the IT policy 360 is AllowVoiceCalling=False. AllowVoiceCalling corresponds to a rule that may be enacted by the security module and/or a voice calling module executable on the device 10, 100 equipped with such a feature, that the user is allowed to use the device 10, 100 to make a voice call. An alternate exemplary rule that would determine the availability of a voice calling or SMS function would be a rule relating to use of a subscriber identity module (SIM) card in a mobile device 100. In this exemplary rule, False indicates that this rule, when in force, does not allow the user to make voice calls. The implementation of IT policies on client devices will be generally understood by those skilled in the art. It will further be appreciated that the IT policy may be generated or stored in other formats, and may not consist of key-value pairs, but rather of other commands or instructions that may be applied by the client device 10, 100 to configure the operation of the device.

Thus, it can be seen that there may be various categories of data stored at the client device 10, 100. Occasionally, it may be desirable to delete data at the client device 10, 100 to prevent its access by an unauthorized party. This deletion, which may comprise either the overwriting of all or substantially all memory addresses in the data store 300, for example all but the addresses used to store the operating system 301 and PIM/messaging applications 305, may be accomplished through the invocation of a "wipe" command.

Figure 6:
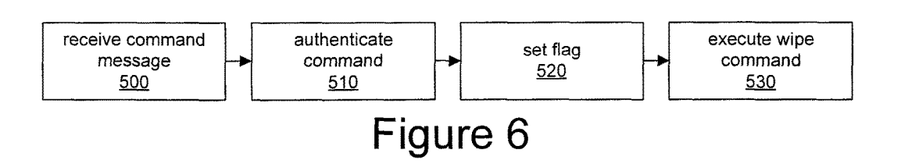
FIG. 6 is a flowchart of a method for processing a wipe command at a communication device.

FIG. 6 is a flowchart depicting a sequence of steps in the execution of the wipe command on the client device 10, 100. At step 500, the command is received at the client device 10, 100. The command itself may have been invoked or input at the client device 10, 100, for example by a user or by an administrator, or at the server 40. For example, invocation of the wipe command may be carried out at the client device 10, 100 by a user or administrator explicitly selecting a wipe command option. The wipe command may alternatively be invoked by a user or administrator deliberately or accidentally engaging in a predetermined action at the client device 10, 100, such as entering a password incorrectly for a predetermined number of times, resulting in receipt at the client device 10, 100 of the incorrect password for the predetermined number of times, or by carrying out another predetermined action or entering into a predetermined condition that triggers the execution of the wipe command by the client device 10, 100. Invocation of the wipe command may be carried out at the server 40 by similar methods. In this description, "receipt" or "receiving" the wipe command includes not only an issuance or invocation of the wipe command, but also a detection, within the client device 10, 100, of a predetermined action, condition or trigger for the execution of the wipe command. The command comprises, or is accompanied by, an indicator of an authorization level associated with the command. If the command is received from the server 40, in one embodiment it is received over the air; for example, a mobile communication device 100 may receive via the transceiver 411 (shown in FIG. 2) an incoming message from a remote location comprising a command at step 500. The client device 10, 100 then verifies or authenticates the received command at step 510. In one embodiment, commands issued by the server 40 to the client device 10, 100 are encrypted in messages sent to the client device, in which case the client device 10, 100 authenticates the received command by passing the received message to a decryption module resident on the client device 10, 100, which decrypts the message and extracts the command. By successfully extracting the command, the client device 10, 100 thus authenticates the command, since the message was encrypted by the server 40 and decrypted using an associated decryption key. Alternatively, the authentication step 510 may be carried out using some other means of verifying the authenticity of the command such that the client device 10, 100 may verify the accuracy and/or the provenance of the command at step 510. The verification may comprise the verification of some shared secret between the client 10, 100 and the server 40 that is incorporated into the message; error correction code; or some other form of verification known in the art, such as a checksum. If the command is received at the client device 10, 100 as an issued or invoked wipe command at the client device 10, 100 or as the detection of a predetermined action, condition, or trigger at the client device 10, 100, then the authentication step 510 may optionally be bypassed.

Following the authentication step or receipt of the wipe command, the client device 10, 100 then sets a flag at step 520 in its non-volatile memory, for example memory 424 of client device 100 shown in FIG. 2. The flag may be set in the memory at a predetermined, hidden location that is not accessible to third parties via an application programming interface, and is set in the event that the client device 10, 100 is powered off before the deletion and/or disablement of applications in response to the security command is completed. The device 10, 100 may be configured so that when it is powered on, a security module or the boot code configures the processor to check the flag bits during boot-up of the device to determine whether the flag was set; if it was set, the security module or boot code aborts any log-in procedure executable on the device and re-invokes the wipe command. Thus, the wipe command cannot be circumvented without erasing the hidden location of the memory of the client device 10, 100. The setting of the flag at step 520 is described in further detail below.

The client device 10, 100 then executes the wipe command at step 530. The process of wiping data can be accomplished by writing zeroes, ones or random combination of ones and zeros to the non-volatile memory 424, and optionally to portions of the volatile memory 426, and/or by removing memory references or pointers to the data in the non-volatile memory 424 and portions of the volatile memory 426. The wiping process may also include repeated overwriting of ones, zeroes, or a random arrangement of ones and zeros over the data to be wiped.

In some circumstances, it may not be desirable to delete all types of data at the client device 10, 100. For example, a wipe of all data stored on the device 10, 100 would have the effect of deleting the IT policy data 315. As described above, the IT policy data 315 determines whether certain functions or data are available to a user of the device 10, 100; if the IT policy data 315 is deleted, then the next time the device 10, 100 is accessed by a user, its operation may not be constrained by any rules set in the IT policy data 315 at all. For example, the IT policy 360 may be configured to prevent a user from making outgoing voice calls (e.g., AllowVoiceCalling=False). This setting may only be in force so long as there is an IT policy stored at the client device 10, 100. If all non-application data were successfully wiped from the device, then the IT policy data 315 would be one of the sets of data deleted; the user would then gain the ability to make outgoing voice calls. Thus, a user may be able to circumvent the IT policy set for his or her device 10, 100, at least temporarily until the device 10, 100 is reconfigured by the server 40 with a new IT policy. The ability to circumvent an IT policy may present a security risk; however, at other times deletion of the IT policy data 315 may be desirable. As a further example, an administrator or user may wish to only delete the PIM/message data stored on the device 10, 100, without affecting other data or the operation of other systems on the device. Thus, the embodiment described herein provides a system for allowing for selective deletion of data at the client device 10, 100.

As noted above, the wipe command is accompanied by or comprises an associated indicator of an authorization level. The indicator value is inserted into the command at the time the command is issued, either at the client device 10, 100 or at the server 40, and its value is determined by the authorization level associated with the issuer of the wipe command. The indicator value may be an alphanumeric value; in accordance with one embodiment, a value of 0 signifies the lowest authorization level, and a value of 4 indicates the highest authorization level. The various authorization levels may be cumulative (i.e., a person with an authorization level of 1 has authority to access the same functions and data at the server 40 and/or client device 10, 100 as a person with an authorization level of 0, plus access to additional functions and data); alternatively, the various authorization levels may be unrelated and have more or less overlap (i.e., a person with an authorization level of 1 may have access to functions and data at the server 40 only, whereas a person with an authorization level of 0 only has access to functions and data at the client device 10, 100). Thus, when the wipe command is received at the client device 10, 100, the flag value is set at step 520 with reference to the indicator value received with the command at step 500 and authenticated at step 510, and with reference to the IT policy stored at the client device 10, 100. There may be more or fewer authorization levels; for example, these systems and methods may operate with only two authorization levels.

Returning to step 520, while in a simple implementation the flag may consist of a single bit indicating whether a wipe is in progress, in another embodiment the flag comprises a multi-bit value corresponding to the authorization level indicated in the indicator accompanying the wipe command. The flag value may be determined using the existing IT policy 360 for the device 10, 100. For example, if the existing IT policy 360 contemplates only one rule relating to the authorization level required to enable a wipe of the IT policy itself, then only a single rule such as ITPolicyWipeMinLevel=1 may be provided in the IT policy 360. This rule, when executed by the device 10, 100, instructs the device to only wipe the IT policy 360 from memory upon execution of a wipe command if the wipe command is accompanied by an indicator of an authorization level or a flag value corresponding to the IT policy 360 of at least 1. In a more robust implementation such as that illustrated in FIG. 4a, the IT policy may comprise rules relating to the authorization level required to enable a wipe of the PIM/message data (PIMMessageDataWipeMinLevel), user-entered data (UserDataWipeMinLevel), IT policy (ITPolicyWipeMinLevel), third-party applications (ThirdPartyAppWipeMinLevel), PIM/message applications (PIMMessageAppWipeMinLevel), or key data (KeyDataWipeMinLevel). In the example of FIG. 4a, an authorization level of 4 is required to wipe the IT policy, but an authorization level of only 0 is required to wipe PIM/message data. Thus, for example, if the authorization level indicated in the command is a 4, then according to the IT policy, all data that requires an authorization level of 4 or less may be wiped, which in the above example includes all data types listed above. If the authorization level indicated is zero, then only that data capable of being wiped with that level of authorization (here, PIM/message data and third-party applications) will be wiped. The types of data to be wiped are indicated in the flag.

Figure 5:
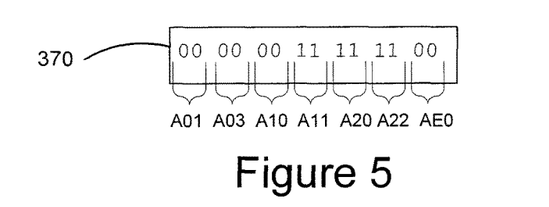
FIG. 5 is a schematic representation of a flag in accordance with one embodiment.

An example of a flag 370 is shown in FIG. 5. The flag 370 comprises a number of subset values correlating to each of the data types stored at the client device 10, 100. In the example of FIG. 5, the two most significant bits correspond to a first data type, here labelled as A01; with reference to FIG. 3, it can be seen that these bits thus correspond to operating system data 301. The remaining pairs of bits, from most to least significant, thus correspond to key data 302, PIM/messaging applications 305, third-party applications 306, PIM/messaging data 310-312, user-entered data 313, and IT policies 315.

In this embodiment, a value of 11 for a pair of bits indicates that the corresponding data type is flagged for wiping. In the example of FIG. 5, the bit pairs corresponding to third-party applications 306, PIM/message data 310-312, and user-entered data 313 have a value of 11. It will be appreciated that the flag 370 does not require two bits for each type of data; for example, the flag 370 may allocate only one bit per data type, or may have whatever format is suitable for the implementation on the client device 10, 100. If, in a further embodiment, the client device 10, 100 is configured to optionally take other steps upon receipt of a wipe command (for example, to encrypt data rather than delete it), then two bits may be necessary in order for the flag to accurately indicate what action is to be taken on the data; for example, 00 may indicate that no action is to be taken; 01 may indicate that the data is to be encrypted; 11 may indicate that the data is to be deleted.

Figure 7A:
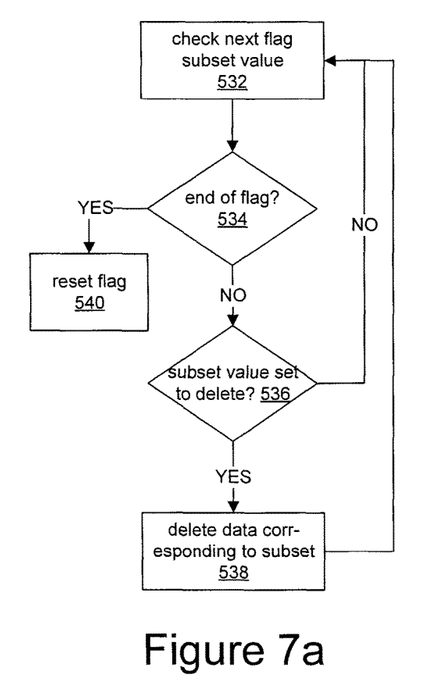
FIGS. 7a and 7b are flowcharts of methods for executing a wipe command.

The execution of the wipe command at step 530 will now be described in detail. In a first embodiment, shown in FIG. 7*a*, the client device 10, 100 is configured to check each subset value contained within the flag 370 in turn. The client device 10, 100 checks the next subset or pair of bits in the flag 370 at step 532. The process may start either with the most significant values or the least significant values. If the device determines that it has reached the end of the flag at step 534, then the flag is reset to a zero value at step 540, indicating that the wipe command execution has been completed. If the end of the flag has not yet been reached, then the device 10, 100 determines whether the subset value is set to the "wipe" value, which in this example is 11, at step 536. If the subset value does not indicate that the corresponding data type is to be wiped, the process returns to step 532. If the subset value indicates that the data type is to be wiped, then at step 538 the client device 10, 100 locates the data corresponding to the type represented by the subset or bit pair in the flag, for example using the table 350 of FIG. 3, and deletes the data. The process then returns to step 532 to check the next subset.

Figure 7B:
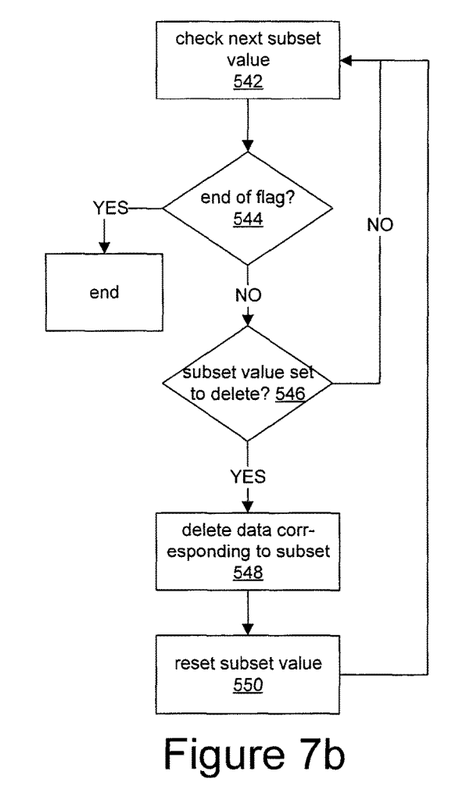

In a second embodiment of the execution of the wipe command, shown in FIG. 7*b*, the wipe process is similar, but the subset values in the flag 370 are reset as the corresponding data is deleted. The client device 10, 100 checks the next subset or pair of bits in the flag 370 at step 542. The process may start either with the most significant values or the least significant values. If the device determines that it has reached the end of the flag at step 544, then the process ends. If the end of the flag has not yet been reached, then the device 10, 100 determines whether the subset value is set to the "wipe" value, which in this example is 11, at step 546. If the subset value does not indicate that the corresponding data type is to be wiped, the process returns to step 542. If the subset value indicates that the data type is to be wiped, then at step 548 the client device 10, 100 locates the data corresponding to the type represented by the subset or bit pair in the flag, for example using the table 350 of FIG. 3, and deletes the data. The subset value is then reset (i.e., overwritten with a 00 value) at step 550. The process then returns to step 542 to check the next subset. It will be appreciated that in either of the foregoing embodiments, the client device may encrypt, rather than delete, the data, or may encrypt the data prior to deleting it. In any event, the data identified by the flag 370 is secured from unauthorized access by either deletion or encryption.

In an alternate embodiment, the rules recorded in the IT policy comprise preconfigured sets of data types that may be wiped by users or administrators of each authorization level. Rather than assigning the ability to wipe a given data type to a minimum authorization level as described with reference to FIG. 4*a* above, the client device 10, 100 stores a set of directives that assign a particular set of data types to an authorization level. With reference to FIG. 4*b*, in the alternate embodiment the IT policy 361 may comprise at least one rule such as DataWipeAuthLevel0=00000000000000. This rule assigns a flag value of 00000000000000 to an authorization level corresponding to 0; for example, the authorization level of a typical user. This user is not authorized to issue a wipe command that wipes any data at the client device 10, 100; for example, if this IT policy were implemented on the client device 10, 100 and a user with authorization level 0 were logged into the device, then either the wipe command would be disabled on the device 10, 100 as long as that user was logged into the device, or alternatively the wipe command may be enabled, but would have no practical effect when executed. The flag values provided in the example provided in FIG. 4*b* may be interpreted in the same manner as those provided in the example of FIG. 5, described above; that is to say, beginning with the most significant pair, the pairs of bits in the flag correspond to the operating system data 301, key data 302, PIM/messaging applications 305, third-party applications 306, PIM/messaging data 310-312, user-entered data 313, and IT policies 315. Again, it will be appreciated that the flag values, when implemented on the client device 10, 100, may have a different format, and that the IT policy 361 may comprise a set of directives for encrypting, in addition to or in place of wiping, the data, as described above.

In the example of FIG. 4*b*, further rules are provided for the user/administration authorization levels 1, 2, and 4 (DataWipeAuthLevel1=00000000111100, DataWipeAuthLevel2=00000011111100, and DataWipeAuthLevel4=00111111111111, respectively); in this embodiment, the client device 10, 100 is configured to implement the IT policy 361 such that if a rule for a given authorization level is missing from the IT policy 361, then the rule in effect for the next available lower authorization level is enforced for that missing authorization level. Thus, in this example, a wipe command issued by a user/administrator with an authorization level of 3 would be governed by the DataWipeAuthLevel2=00000011111100 rule. It can be seen that in this particular example, which is not intended to be limiting concerning the formatting of rules or flag values, only those users/administrators with an authorization level of 3 are capable of issuing a wipe command that will wipe the IT policy data 315 and the key data 302. It will be appreciated that the execution of the wipe command will generally follow the same process as that described in respect of FIG. 4*a*. When the user device 10, 100 sets the flag at step 520 of FIG. 6, it will locate the appropriate rule in the IT policy 361 according to the authorization level indicator detected in the received wipe command; then, if the value provided in the rule is in the appropriate format, the client device 10, 100 may utilize that value directly as the flag value in the subsequent execution of the wipe command in step 530.

It will be appreciated that this information need not be contained in a single IT policy file stored at the client device 10, 100; the wipe rules may be stored in a separate file or a different location in memory. In accordance with various embodiments, the rules are incorporated into the IT policy that is updatable by an administrator or user at the server 40. Also, the ability of an administrator or user to add or remove data types to each rule may be determined by the administrator's or user's authorization level. For example, an administrator with an authorization level of 4 may be able to access server functions to designate which authorization levels up to and including level 4 may issue a command to wipe which data types. An administrator with an authorization level of 3 would thus lack sufficient permission to alter the wipe data types or wipe permissions (that is, the data types for which a person at a given authorization level is permitted issue a wipe command to a client device 10, 100) for a level 4 administrator, but would be capable of altering the wipe permissions for an administrator of level 0, 1, 2, or 3.

Figure 9A:
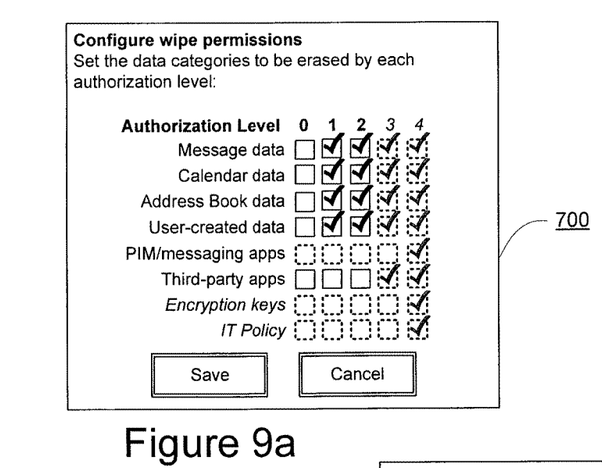
FIGS. 9a, 9b, and 9c are further example user interfaces for configuring wipe permissions.

However, in order to ensure that a lower-level administrator does not add the ability to wipe highly sensitive data, such as encryption key data 302, when the intention is to restrict that ability to only the highest of authorization levels, the available data categories that are configurable by each administrator/user level may be cascaded. Turning to FIG. 9a, an example of an administrative interface 700, such as a dialog box that may be displayed at the server 40 for configuring the various authorization-wipe rules for the IT policy 361, is shown. Each level of administrator/user, with the exception of the highest level of authorization, is provided with access to modify only the wipe permissions for lower authorization levels; but the ability to modify the wipe permissions for those lower authorization levels is determined by the permissions granted to the authorization level currently logged into the server 40. In FIG. 9a, for example, an administrator of authorization level 3 is logged in; because only an administrator of authorization level 4 is provided authority by the server functions to alter the authorization level 3 wipe permissions, the checkboxes for selecting data types wipable by administrators of authorization levels 3 and 4 are not alterable, as can be seen by the formatting of the headings "3" and "4" in the interface 700, and the dashed lines in the checkboxes under those headings. The administrator currently logged into the server in this example is able to make certain changes to the wipe permissions of authorization levels 0, 1, and 2, but only for those data types for which the administrator has permission to wipe; in other words, the currently logged-in administrator cannot grant wipe permissions that he or she does not currently have. In the example of FIG. 9a, the currently logged-in administrator has permission to wipe message data, calendar data, address book data, user-created data, and third-party applications, but not PIM/messaging applications, encryption keys, or IT policies, and is therefore presented with a set of configuration options enabling the logged-in administrator to configure security operations such as wiping and/or encryption for users and administrators having a lower authorization level. Thus, the selection boxes for PIM/messaging applications, encryption keys, and IT policies are disabled (as illustrated in FIG. 9a, with dashed lines) for all levels of authorization.

Figure 9B:
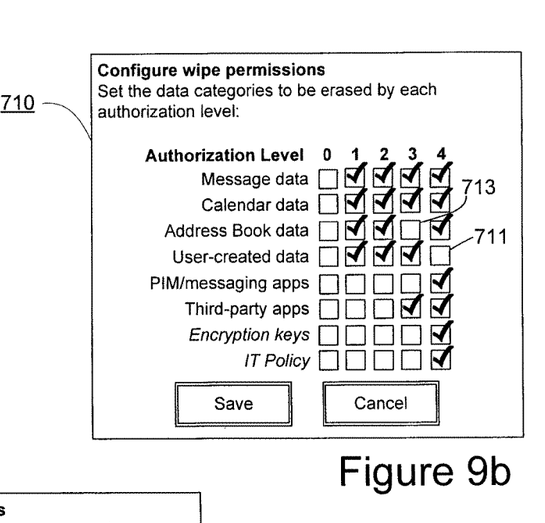

In the example of FIG. 9b, an administrator with authorization level 4 is logged in; therefore, all selections are available to the currently-logged in administrator, as depicted by the solid-line checkboxes and formatting of the example interface 710. In this embodiment, the currently-logged in administrator may alter the wipe permissions for its own level, 4, without any effect on the permissions that this level of administrator may grant to other levels. In the example of FIG. 9b, this administrator has chosen to remove its own permission to wipe user-created data on the client device 10, 100, as can be seen from the lack of a checkmark in the checkbox 711. However, this administrator is still able to alter the wipe permissions for the same category of data for all other levels. Further, in this example of FIG. 9b, the level 4 administrator has further disabled the level 4 administrator's wipe permission in relation to address book data as can be seen at the selection box 713, but the level 2 and 3 administrators or users are still provided with permission to wipe that data category.

Figure 9C:
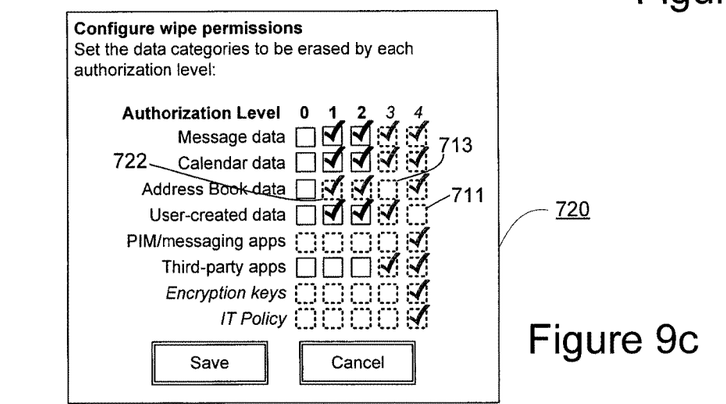

FIG. 9c depicts the interface 720 when a level 3 administrator logs into the server 40 after the level 4 administrator has made the changes described in relation to FIG. 9b. As can be seen, the level 3 administrator again lacks the authority to modify its own wipe permissions. However, despite the fact that the level 4 administrator had chosen to disable its own ability to wipe user-created data by deselecting the option 711, because the level 3 administrator was still provided with permission to wipe that data type, the level 3 administrator may still administer that wipe permission for lower levels of authorization. However, because, as discussed in relation to FIG. 9b, the level 4 administrator had disabled the level 3 administrator's wipe permission with respect to address book data by deselecting 713, the level 3 administrator is now unable to alter the wipe permissions for that data type for the other administration/user levels; this is denoted in FIG. 9c by the dashed lines of the selection boxes such as 722. Because the level 4 administrator had granted the level 1 and 2 administrators wipe permissions for address book data, the corresponding selection boxes are checked. Thus, the wipe permissions set by the level 4 administrator may override the wipe permissions that might otherwise be configurable by the lower level administrators.

In this embodiment, after input or alteration of wipe permissions for a user, a new IT policy reflecting the newly configured wipe permissions is constructed at the server 40 and transmitted to the client device 10, 100. It will be appreciated that according to the implementation of the server functions at the server 40, the IT policy thus constructed may be applied to each and every client device 10, 100 registered at the server 40, or to only a subset of those devices.

By defining at the client device 10, 100 the authorization levels required to be able to wipe a given data type, it is not necessary for a user or administrator at a server to choose the particular types of data that are to be deleted as a result of a wipe command at the time the wipe command is issued: the actual determination and identification of the data to be deleted is carried out at the client device 10, 100 itself, when the wipe command is executed. There is no need for the server 40 to track the different types of data that are stored on the client device 10, 100.

Figure 8A:
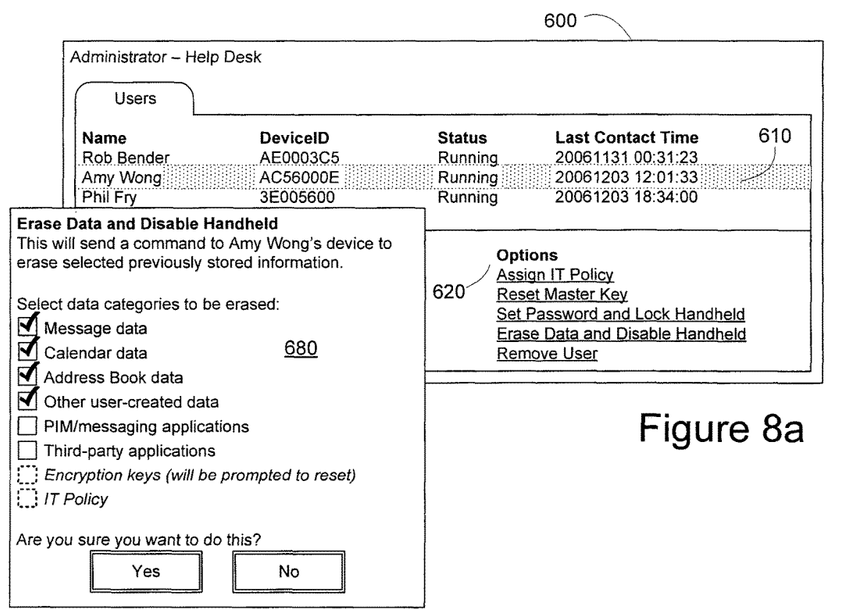
FIGS. 8a and 8b are example user interfaces for issuing a wipe command.
Figure 8B:
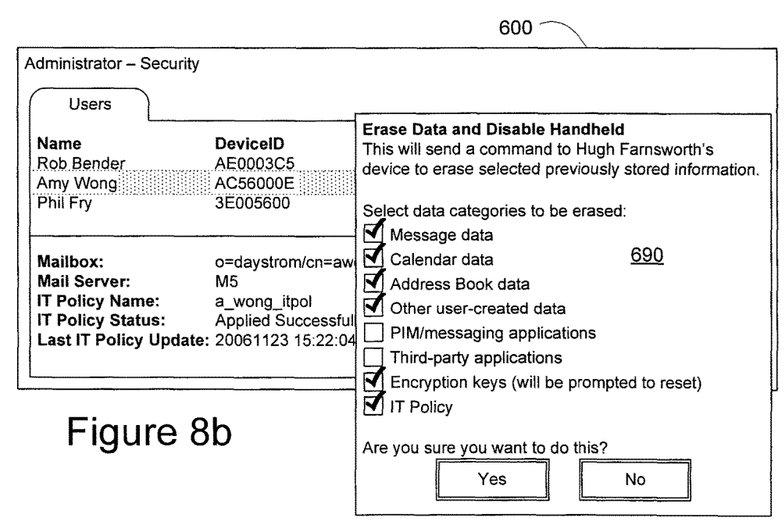

In the examples described above, the user's or the administrator's authorization level indicated in the wipe command is associated with a predetermined set of data types to be wiped by the client device 10, 100 upon execution of the wipe command at step 530. In a still further embodiment, the authorization level is still associated with a predetermined set of data types that may be the subject of a wipe command issued by that user or administrator, but the user or administrator is also provided with the option of selecting a subset of the predetermined set of data types to be made the subject of a wipe command. Referring to FIG. 8a, an exemplary user interface 600 at a server 40 that may be presented to one category of user or administrator, for example a help desk administrator, is shown. The user interface 600 comprises a listing of users whose accounts may be administered by the help desk administrator logged into the server 40. The administrator may select one user, such as the user 610, and select an option to "Erase Data and Disable Handheld" from a listing of options. The user interface may then comprise a pop-up dialog box, such as dialog box 680, which provides the help desk administrator with a listing of available data types that may be erased, including "Message Data", "Calendar Data", "Address Book data", "Other user-created data", "PIM/messaging applications", and "Third-party applications". However, the further two options shown in the dialog box 680, "Encryption keys" and "IT Policy", are not available to this help desk administrator as can be seen from the different formatting of these last two options, because this administrator was not provided with sufficient privileges to delete these data types. Thus, the help desk administrator may not select either "Encryption keys" or "IT Policy" to be deleted on a user's device 10, 100. By contrast, FIG. 8b shows a further user interface 600, when the server 40 is operated by a security administrator with greater privileges than the help desk administrator. In this embodiment, the administrator logged into the server 40 is authorized to issue a wipe command that includes wiping the encryption keys and IT policy; these options in dialog box 690 are, therefore, available to be selected, as can be seen from the formatting in the dialog box 690. In this further embodiment, the wipe command issued from the server may comprise at least one indicator of the type or types of data to be wiped by the client device 10, 100 in executing the wipe command. The wipe command may further comprise the authorization level of the party issuing the authorization level, so that the client device 10, 100 may also verify that the issuer possesses sufficient authority to issue the command to wipe the data types indicated at the authentication step 510. It will be appreciated that this embodiment may be implemented at the client device 10, 100 as well.

The foregoing systems and methods thus provide a means for selectively wiping data at a client device 10, 100, depending on the authorization level of the issuer of the wipe command. The issuer of the wipe command may be a user or administrator using the client device 10, 100, and inputting the wipe command on the client device, or a user or administrator at the server 40 issuing the wipe command. At either the client device 10, 100 or the server 40, the user and/or administrator may be provided with one of a number of authorization levels, which is determined by the device 10, 100 or the server 40, as the case may be, when the individual logs into the device or server. In one embodiment, an IT policy stored at the client device defines the various types of data that may be selected for wiping.

By thus identifying the data to be wiped at the client device on a more "granular" level, according to the wipe command issuer's authorization level, it is possible to avoid the situation where a user deliberately circumvents an IT policy in order to gain access to functions that the user was not intended to use. For example, a user of the device 10, 100 may be able to invoke a wipe command at the device by selecting a menu option at the device 10, 100, or by otherwise deliberately triggering a wipe using the device; as shown in the example described above, while message data, calendar data, and the like may be deleted as a result of this wipe command, the IT policy itself is not deleted, and remains in force on the device 10, 100. However, if an administrator with a higher level of authorization were to issue the command, then the IT policy may be deleted.

The systems and methods disclosed herein are presented only by way of example and are not meant to limit the scope of the present disclosure. Other variations of the systems and methods described above will be apparent to those skilled in the art and as such are considered to be within the scope of the present disclosure. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method of securing data on a client device, the method comprising:
   determining, at a server, an authorization level for a command issuer when the command issuer logs into the server, the command issuer being associated with one of a plurality of authorization levels;
   creating, at the server, a securing command for securing the client device; and
   transmitting the securing command from the server to the client device, wherein the securing command for securing the client device secures at least one data type in a plurality of data types that is not user-created data, and wherein the determined authorization level associated with the command issuer is an administrator authorization level, and wherein creating the securing command includes generating the securing command to secure data that is not user-created data and preventing the securing of user-created data.

2. The method of claim 1, wherein the command issuer that defines a predetermined number of times a password is allowed to be incorrectly entered is associated with an administrator authorization level.

3. The method of claim 1, wherein the securing includes deleting at least one data type of a plurality of data types stored on the client device.

4. The method of claim 1, wherein the client device stores data of a plurality of data types, and wherein the securing includes encrypting at least one data type.

5. The method of claim 4, wherein the command issuer is a user, and wherein the at least one data type is personal data associated with the user.

6. The method of claim 5, wherein a second data type is not the at least one data type to be encrypted, and wherein the second data type is not associated with the created securing command.

7. The method of claim 1, wherein the client device stores data of a plurality of data types, and wherein the command issuer is an administrator, and wherein securing the client device includes securing at least one data type that is not personal data.

8. The method of claim 7, wherein a second data type is personal data, and wherein the second data type is not associated with the created securing command.

9. The method of claim 1, wherein the securing command for securing the client device includes securing at least one of applications, data files created at the client device, or data received at the client device that are personal to a user.

10. The method of claim 1, wherein creating a securing command for securing the client device comprises:
- determining that the client device is to be secured based on the command issuer defining, at the server, a predetermined number of times a password is allowed to be incorrectly entered at the client device; and
- generating the securing command for securing the client device when the password is incorrectly entered at the client device the predetermined number of times.

11. A server comprising:
- a memory;
- a communication subsystem; and
- a processor operatively connected to the memory and the communication subsystem, the processor being configured to:
- determine an authorization level for a command issuer when the command issuer logs into the server, the command issuer being associated with one of a plurality of authorization levels;
- create a securing command for securing a client device; and
- transmit the securing command from the server to the client device, wherein the securing command for securing the client device secures at least one data type in a plurality of data types that is not user-created data, and wherein the determined authorization level associated with the command issuer is an administrator authorization level, and wherein creating the securing command includes generating the securing command to secure data that is not user-created data and preventing the securing of user-created data.

12. The server of claim 11, wherein the command issuer that defines a predetermined number of times a password is allowed to be incorrectly entered is associated with an administrator authorization level.

13. The server of claim 11, wherein the securing includes deleting at least one data type of a plurality of data types stored on the client device.

14. The server of claim 11, wherein the client device stores data of a plurality of data types, and wherein the securing includes encrypting at least one data type.

15. The server of claim 14, wherein the command issuer is a user, and wherein the at least one data type is personal data associated with the user.

16. The server of claim 15, wherein a second data type is not the at least one data type to be encrypted, and wherein the second data type is not associated with the created securing command.

17. The server of claim 11, wherein the client device stores data of a plurality of data types, and wherein the command issuer is an administrator, and wherein securing the client device includes securing at least one data type that is not personal data.

18. The server of claim 17, wherein a second data type is personal data, and wherein the second data type is not associated with the created securing command.

19. The server of claim 11, wherein creating a securing command for securing the client device comprises:
- determining that the client device is to be secured based on the command issuer defining, at the server, a predetermined number of times a password is allowed to be incorrectly entered at the client device; and
- generating the securing command for securing the client device when the password is incorrectly entered at the client device the predetermined number of times.

20. A non-transitory computer-readable medium storing code which, when executed by one or more processor of a server, cause the server to perform operations comprising:
- determining an authorization level for a command issuer when the command issuer logs into the server, the command issuer being associated with one of a plurality of authorization levels;
- creating a securing command for securing a client device; and
- transmitting the securing command from the server to the client device, wherein the securing command for securing the client device secures at least one data type in a plurality of data types that is not user-created data, and wherein the determined authorization level associated with the command issuer is an administrator authorization level, and wherein creating the securing command includes generating the securing command to secure data that is not user-created data and preventing the securing of user-created data.

* * * * *